Nov. 19, 1968          H. F. WELSH          3,412,307
CURRENT LIMITING MOTOR CONTROL CIRCUIT
Filed Dec. 8, 1964
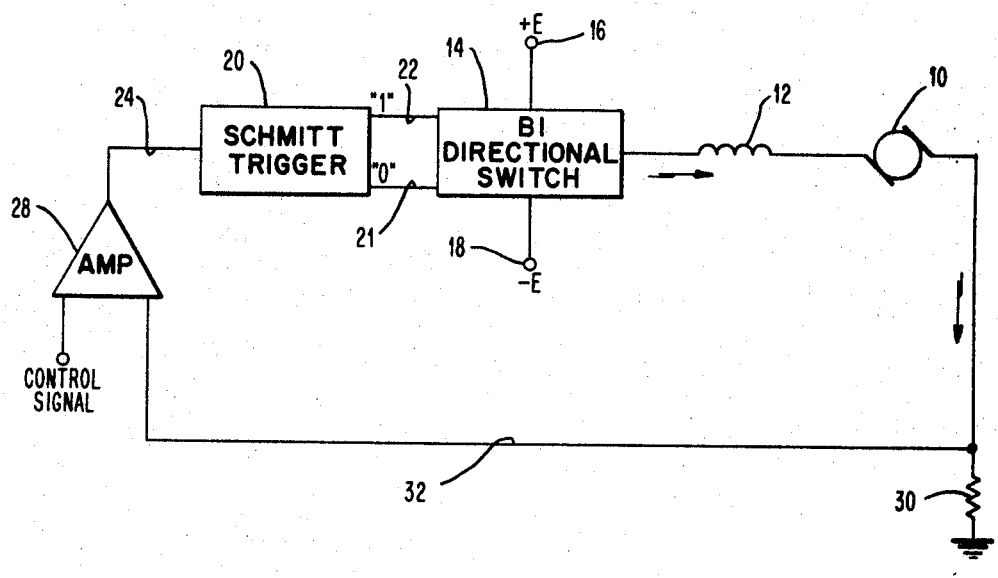
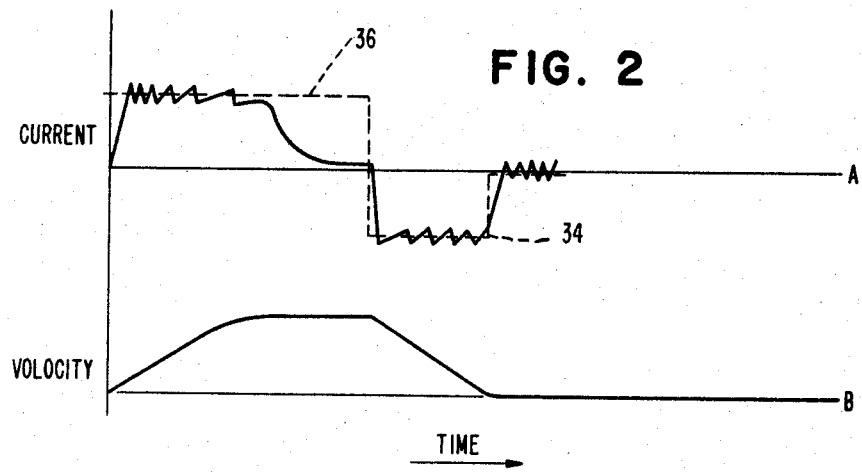
INVENTOR
HERBERT F. WELSH, DECEASED
JULEA S. CHAPLINE, EXECUTRIX
BY *Edward M. Ferrell*
ATTORNEY

United States Patent Office 3,412,307
Patented Nov. 19, 1968

3,412,307
CURRENT LIMITING MOTOR CONTROL CIRCUIT
Herbert Frazer Welsh, deceased, late of Philadelphia, Pa., by Julea S. Chapline, executrix, Philadelphia, Pa., assignor to Sperry Rand Corporation, New York, N.Y., a corporation of Delaware
Filed Dec. 8, 1964, Ser. No. 416,934
6 Claims. (Cl. 318—394)

ABSTRACT OF THE DISCLOSURE

The present device provides bidirectional switch in a circuitry which is connected to a D.C. motor. Connected to the output of the D.C. motor is a feedback circuit which is connected to the bidirectional switching circuitry. The bidirectional switching circuitry includes a comparison device and a threshold device which enables the feedback circuit to be compared against a control signal which further enables a binary signal to be produced at the threshold device. In response to the binary signal the bidirectional switching circuitry provides current in either a positive or a negative sense. Accordingly, the net current supplied to the D.C. motor in either polarity sense is limited and in this way the dangers which accompany an accelerating D.C. motor are eliminated.

---

This invention relates to direct current motors, and more particularly to means for attaining high acceleration in such motors.

It is well known that when a direct current motor is at rest, it offers a very low resistance to the flow of current and destructive current would flow through the motor if it were suddenly connected directly across the source of driving voltage.

Generally in order to protect the motor during a starting operation, a rheostat or resistor is inserted in the motor circuit. As the motor gains speed, the resistance in the motor circuit is decreased. After the motor has acquired a certain velocity, a counter EMF is developed so as to limit the current to the motor to a safe operating level.

There are many systems in which it is desired to provide a maximum acceleration or deceleration of the motor. Such cases, for example, may include computer systems in which it is desired to move a transducer to selected information tracks on a magnetic drum or disk. Such systems generally involve a large number of transducer movements. It is therefore necessary to be able to quickly start and stop the transducer head in order to provide maximum efficiency in the computer operation. Very often, D.C. or servo motors are employed as the driving means for the transducers mentioned.

In order to achieve maximum acceleration, it normally would be desirable to apply a maximum current to the motor. At the same time, however, it is necessary that this maximum current is not excessive or sufficient to burn out the motor. In the past, current limit acceleration has been employed to provide maximum acceleration of a D.C. motor. In the current limit systems, a set of current relays is made to function, i.e. pick up and drop out, for changing values of armature current as the motor accelerates. The relays, in turn, operate to energize contacts as to successively cut out or short circuit a number of resistors.

While current limit systems used heretofore have provided means for attaining high acceleration, they have, in the main, involved relatively complex and expensive circuitry.

It is an object of this invention to provide an improved system for achieving high acceleration in a D.C. motor.

It is still a further object of this invention to provide acceleration in a D.C. motor by means of an improved current limit circuit.

It is still a further object of this invention to provide an improved circuit to provide maximum acceleration in a D.C. motor when the motor is moved in either of two directions.

In accordance with the present invention, a circuit is provided for producing maximum acceleration of a direct current motor. When current is first applied to the motor, an output voltage corresponding to the maximum safe current requirements of the motor is produced to drive the motor through a bi-directional switching circuit. The switching circuit switches the input current to the motor on and off at a relatively high rate of speed. A maximum safe current is applied to the motor until it reaches its maximum velocity, at which point a relatively constant current is applied to the motor.

Other objects and advantages of the present invention will be apparent and suggest themselves to those skilled in the art, from a reading of the following specification and claims, in which:

FIGURE 1 is a diagram, partly in schematic and partly in block diagram form, of a motor control circuit, in accordance with the present invention, and FIGURE 2 represents waveforms shown for the purpose of describing the invention illustrated in FIGURE 1.

Referring particularly to FIGURE 1, a D.C. motor 10 is connected to receive a bi-directional current through an inductor 12 from a bi-directional switch 14. The bi-directional switch is connected to a positive source of voltage at the terminal 16 and to a negative source voltage at the terminal 18. One or the other of the positive and negative sources is connected to drive the motor 10 dependent upon the operating state of the bi-directional switch 14.

The operation of the bi-directional switch 14 is controlled by a Schmitt trigger circuit 20, or by other suitable bistable circuits. When a high signal is developed by the Schmitt trigger circuit 20 at the output lead 22, the bi-directional switch 14 becomes operative so as to apply a positive voltage from the terminal 16 to drive the motor 10. When the voltage level at the output lead 22 is high, the voltage level at the output lead 21 is low. When the output signal level at the output lead 22 is low, the signal level at the output lead 21 is high and a negative voltage from the terminal 18 is applied to the motor 10.

The Schmitt trigger circuit 20 is adapted to be set when an input voltage exceeding a predetermined level is applied to its input lead 24. When the voltage level at the input lead 24 drops below the predetermined level, the Schmitt trigger circuit 20 is reset. Consequently, the voltage level at the output leads 21 and 22 will be high or low, respectively, dependent upon the input signal to the Schmitt trigger circuit 20.

In considering the operation, and referring to the waveforms A and B of FIGURE 2 along with FIGURE 1, first assume that the motor 10 is in its inactive state and it is desired to drive the motor in a forward direction. A control signal as illustrated in waveform A, represented by dotted lines 36 in FIGURE 2, is applied to a differential amplifier 28. The output signal from the differential amplifier 28 is of sufficient level to trigger or set the Schmitt trigger circuit 20 so that a high signal level is developed at the output lead 22. Under these conditions, the positive voltage from the terminal 16 causes current to flow through the bi-directional switch 14, the inductor 12, the motor 10 and a resistor 30 to a point of reference potential, designated as ground. The purpose of the resistor 30 will be described in greater detail.

When the current through the motor 10 reaches a predetermined value, a voltage is developed across the resistor 30. The voltage developed across the resistor 30 is fed back to the input circuit of the differential amplifier 28 through a lead 32. The voltage at the lead 32 is such so as to provide a lower output signal from the differential amplifier 28 at the lead 24. The lower voltage at the lead 24 causes the Schmitt trigger circuit 20 to become reset producing a low level voltage signal at the lead 22 and a high voltage at the lead 21. The low level signal at the lead 22 causes a bi-directional switch 14 to disconnect the source of positive voltage at the terminal 16 from motor 10. At the same time, the source of negative voltage from the terminal 18 is connected to the motor 10.

When the voltage level at the output lead 22 drops from a high to a low level, the current through the motor 10 starts to decrease. Likewise, the voltage developed across the resistor 30 also decreases. When the voltage across the resistor 30 decreases, the output voltage at the lead 24 increases causing the Schmitt trigger circuit 20 to be reset. Consequently, the Schmitt trigger circuit is continuously switched back and forth between its set and reset states at a relatively high frequency.

A frequency of the switching of the Schmitt trigger circuit is related to the amount of current change, as determined by the hysteresis of the Schmitt trigger circuit and to the rate of change of current as determined to some extent by the voltage developed across the inductor 12. The rate of switching is chosen as a compromise to keep it small enough to prevent switching wear and large enough so that a relatively constant current is applied to the motor 10.

When a relatively high constant current applied to the motor 10, the motor accelerates with maximum acceleration until it is nearly at full speed. The waveform B of FIGURE 2 illustrates the velocity versus time of the motor 10. It is noted that while a maximum current is used to drive the motor, this current is still limited to a safe maximum value because of the voltage fed back to the Schmitt trigger circuit from the resistor 30.

During the first part of acceleration the current rises and varies at the same rate since there is no back voltage across the motor. When a back voltage is generated in the motor, the rise of current is much longer, and the fall shorter than at the beginning. Eventually, the current falls to its steady load value so as to continuously apply current of the source of positive potential from the terminals 16, when the motor is driven in one direction. If the motor is driven in the opposite direction, the negative source of voltage is applied to the motor from the terminal 18.

Up to this point, this has been considered a situation in which the motor 10 is driven in a first direction by the application of a positive voltage thereto during the duration of the positive control signal 36 (FIGURE 2A). Now consider a situation where it is desired to decelerate and stop the motor 10. This is done by applying a negative control signal 34 to the amplifier 28.

When the negative portion of the control signal 34 is applied to the amplifier 28, a switching process similar to that previously described takes place. During the first portion of the deceleration, the rise of current is much longer than the fall. When the motor reaches zero velocity, the control input is returned to zero. The bi-directional switch 14, at this point, continues to switch back and forth. However, no net current is applied to the motor 10. Means for preventing the continued switching may, of course, be provided, if desired.

The operation of the Schmitt trigger circuit and the associated feed back network including the resistor 30 with the negative control signal applied to the system is basically the same as that described in connection with the application of the positive portion of the control signal. The main difference in the latter operation is that the negative voltage from the terminal 18 is applied to the motor 10 rather than the positive voltage from the terminal 16.

Thus it is seen that a positive control signal is used to drive the motor 10 in a first direction with a negative control signal being subsequently applied to decelerate and stop the motor.

If it is desired to drive the motor 10 in the opposite direction, the control signal applied will be opposite to that illustrated in waveform A of FIGURE 2. In the latter case, the first portion of the control signal would be negative to cause the negative voltage from the terminal 18 to be applied to the motor through the bi-directional switch 14. The next position of the control signal would be positive to provide deceleration and stopping of the motor.

The above-described has illustrated how the motor 10 is brought up to full speed in either of two directions and then stopped. Other velocity patterns may be obtained by applying the appropriate patterns of voltages at the control inputs. Many systems, for example, do not require that the motor be brought up to full velocity. This is true in systems where elements have to be moved only short distances, as transducers being moved to different information tracks on a magnetic drum in a computer system, for example.

The bi-directional switch 14 one of the many circuits well known to those skilled in the art. Since the switch 14 is well known and only incidentally related to the present invention, details relative thereto are not given. Some examples of such bi-directional switches, however, include transistor circuits or bi-directional transistors. In some cases, relay circuits may be actuated to cause switching from one or the other of positive or negative voltage sources.

The present invention has provided a relatively simple circuit for permitting a maximum current to be applied to a motor to attain maximum acceleration. At the same time, means including a feed back and switching network assumes that the driving current does not exceed a safe maximum operating value.

The embodiments of the invention in which an exclusive property or privilege is claimed are defined as follows:

1. A driving circuit for driving an element comprising a source of voltage, a bidirectional switching circuit connected to said source for switching said voltage into a positive or negative sense at a high frequency rate to cause current to bidirectionally flow in said element, signal comparison means having at least two inputs and an output, one of said inputs being adapted to receive a control signal, first circuit means connecting said output of said signal comparison means to said bidirectional switching circuit, an output circuit connected to said element, means connected with said output circuit of said element for developing a voltage thereacross in accordance with the current through said element and a feedback network for applying said developed voltage to said signal comparison means to enable said switching circuit to switch the operating condition thereof to limit the current in either said positive or negative sense through said element.

2. A current limit circuit for providing maximum acceleration of a direct current motor comprising a motor, sources of voltage of opposite polarities, a bidirectional switching circuit connected to said sources for applying voltage from one or the other of said source to cause current to flow in said motor in a direction dependent upon the polarity of the voltage applied thereto, signal comparison means having at least two inputs and an output, one of said inputs being adapted to receive a control signal, first circuit means connecting said output of said signal comparison means to said bidirectional switching circuit, an output circuit connected to said motor, means associated with said output circuit of said motor for developing a voltage thereacross corresponding to the rate of current applied to said motor, a feedback network for applying said developed voltage to said signal comparison means to enable said switching circuit to switch the operating condition thereof to control the current through said motor.

3. A current limit circuit for providing maximum acceleration of a direct current motor comprising a motor having an output circuit and whose speed is dependent upon the amount of current applied thereto, sources of voltage of opposite polarities, a bidirectional switching circuit for applying voltage from one or the other of said sources to cause current to flow in said motor in a direction dependent upon the polarity of the voltage applied thereto, signal comparison means having at least two inputs and an output, one of said inputs being adapted to receive a control signal, said last mentioned output being connected to said bidirectional switching circuit, a resistor connected in the output circuit of said motor for developing a voltage thereacross corresponding to the rate of current applied to said motor, a feedback network for applying the developed voltage across said resistor to said switching circuit through said comparison means to switch the operating conditions thereof to cause the current through said motor to be limited to a maximum safe operating value as long as the speed of said motor is accelerating, said developed voltage becoming stabilized at a value lower than said maximum safe operating value when said motor reaches maximum velocity.

4. A current limit circuit for providing maximum acceleration of a direct current motor comprising a motor whose speed is dependent upon the amount of current applied thereto, source of voltage of opposite polarities, a bidirectional switching circuit for applying voltage from one or the other of said sources to cause current to flow in said motor in a direction dependent upon the particular source applied thereto, a control signal source means connected to said bidirectional switching means for applying a control signal to control the operating state of said bidirectional switching circuit, a load resistor connected in the output circuit of said motor for developing a voltage thereacross corresponding to the rate of current applied to said motor, a feedback network connected to said control signal means for applying said developed voltage to said switching circuit through said control signal means to switch the operating conditions thereof to cause the current through said motor to be limited as said motor accelerates, said developed voltage becoming stabilized when said motor reaches maximum velocity.

5. A current limit circuit for providing maximum acceleration of a direct current motor comprising a motor whose speed is dependent upon the amount of current applied thereto, sources of voltage of opposite polarities, a bidirectional switching circuit for applying voltage from one or the other of said source to cause current to flow in said motor in a direction dependent upon the polarity of the particular voltage source applied thereto, a bistable circuit for operating in one of two stable state connected to said bidirectional switching circuit to control the operation thereof, the operating state of said bi-stable circuit thereby determining the polarity of the voltage applied to said motor, a differential amplifier connected to switch said bi-stable circuit to one or the other of said stable states, a control signal source, means for applying said control signal to said differential amplifier, a load resistor connected in the output circuit of said motor for developing a voltage thereacross corresponding to the rate of current applied to said motor, a feedback network for applying said developed voltage to said differential amplifier whereby the output signal from said differential amplifier actuates said bi-stable circuit to switch the operating conditions of said bidirectional switching circuit to cause the current through said motor to be limited as long as the speed of said motor is accelerating, said developed voltage becoming stabilized when said motor reaches maximum velocity.

6. A current limit circuit for providing maximum acceleration of a direct current motor comprising a motor whose speed is dependent upon the amount of current applied thereto, an inductive element connected in series with said motor, sources of voltage of opposite polarities, a bidirectional switching circuit for applying voltage from one or the other of said sources to cause current to flow in said motor in a direction dependent upon the polarity of the particular voltage source applied thereto, a bistable circuit for operating in one of two stable states connected to said bidirectional switching circuit to control the operation thereof, the operating state of said bi-stable circuit thereby determining the polarity of the voltage applied to said motor, a differential amplifier connected to switch said bi-stable circuit to one or the other of said stable states, a control signal source for generating a control signal of one polarity to accelerate said motor and a signal of the opposite polarity to decelerate and stop said motor, means for applying said control signal to said differential amplifier, a load resistor connected in the output circuit of said motor for developing a voltage thereacross corresponding to the rate of current applied to said motor, a feedback network for applying said developed voltage to said differential amplifier whereby the output signal from said differential amplifier actuates said bi-stable circuit to switch the operating conditions of said bidirectional switching circuit to cause the current through said motor to be limited as long as the speed of said motor is accelerating, said developed voltage becoming stabilized when said motor reaches maximum velocity.

References Cited

UNITED STATES PATENTS

| 3,250,979 | 5/1966 | Shaw | 318—395 |
| 3,034,032 | 5/1962 | McWilliams | 318—434 |
| 2,754,463 | 7/1956 | Hansen et al. | 318—434 X |
| 2,701,327 | 2/1955 | Ringoen | 318—28 |
| 2,666,175 | 1/1954 | Seeger | 318—373 X |
| 2,646,540 | 7/1953 | Taylor | 318—373 X |

ORIS L. RADER, *Primary Examiner.*

G. SIMMONS, *Assistant Examiner.*